United States Patent
Combs

(10) Patent No.: US 12,135,140 B2
(45) Date of Patent: Nov. 5, 2024

(54) PROCESS FOR FORMING A REGISTER BOX THAT IS ADAPTABLE TO DUCTWORK OF AN HVAC SYSTEM

(71) Applicant: STERLING CUSTOM SHEET METAL, INC., Magnolia, TX (US)

(72) Inventor: Sterling Kidd Combs, Magnolia, TX (US)

( * ) Notice: Subject to any disclaimer, the term of this patent is extended or adjusted under 35 U.S.C. 154(b) by 174 days.

(21) Appl. No.: 18/049,669

(22) Filed: Oct. 26, 2022

(65) Prior Publication Data

US 2023/0194121 A1 Jun. 22, 2023

Related U.S. Application Data

(60) Continuation-in-part of application No. 17/196,678, filed on Mar. 9, 2021, which is a continuation-in-part of application No. 17/175,956, filed on Feb. 15, 2021, now Pat. No. 12,104,820, which is a continuation-in-part of application No. 17/175,922, filed on Feb. 15, 2021, now Pat. No. 12,000,613, which is a continuation-in-part of application No. 17/171,638, filed on Feb. 9, 2021, now Pat. No. 12,083,716, which is a continuation-in-part of application No. 16/036,059, filed on Jul. 16, 2018, (Continued)

(51) Int. Cl.
*B29C 41/20* (2006.01)
*B29C 44/18* (2006.01)
*B29C 44/36* (2006.01)
*B29K 75/00* (2006.01)
*B29K 105/00* (2006.01)
*F24F 13/06* (2006.01)
*F24F 13/08* (2006.01)

(52) U.S. Cl.
CPC ............ *F24F 13/082* (2013.01); *B29C 41/20* (2013.01); *B29C 44/18* (2013.01); *F24F 13/06* (2013.01); *B29C 44/36* (2013.01); *B29K 2075/00* (2013.01); *B29K 2105/0058* (2013.01); *B29K 2995/0015* (2013.01); *Y10T 29/49158* (2015.01); *Y10T 428/233* (2015.01)

(58) Field of Classification Search
CPC ..................................................... B29C 41/20
See application file for complete search history.

(56) References Cited

U.S. PATENT DOCUMENTS

| | | |
|---|---|---|
| 3,985,158 A | 10/1976 | Felter |
| 4,735,235 A | 4/1988 | Anderson |
| 5,095,942 A | 3/1992 | Murphy |
| 5,658,196 A | 8/1997 | Swaim |
| 5,749,190 A | 5/1998 | Williams |
| 5,957,506 A | 9/1999 | Stepp |

(Continued)

*Primary Examiner* — Nahida Sultana
*Assistant Examiner* — Virak Nguon
(74) *Attorney, Agent, or Firm* — Egbert, McDaniel & Swartz, PLLC

(57) ABSTRACT

A process for forming a register box has a body formed with a plurality of side panels arranged in a generally square or rectangular configuration with a wall extending transverse to the side panels. A plurality of circular areas are cut into the wall. An expandable polymeric foam material is introduced into an interior of the body. The body is positioned in a fixture such that the wall is juxtaposed against a surface of the fixture. A plug is inserted into the interior of the body. The expandable polymeric foam material is expanded in the interior of the body such that the expandable polymeric foam material solidifies across the wall and around the plug. The plug is then removed from the body and the body is then removed from the fixture.

18 Claims, 6 Drawing Sheets

Related U.S. Application Data now Pat. No. 11,060,756, which is a continuation-in-part of application No. 16/005,235, filed on Jun. 11, 2018, now Pat. No. 11,402,121, and a continuation-in-part of application No. 15/864,612, filed on Jan. 8, 2018, now Pat. No. 10,995,969, said application No. 16/005,235 is a continuation-in-part of application No. 15/703,436, filed on Sep. 13, 2017, which is a continuation-in-part of application No. 15/439,454, filed on Feb. 22, 2017, now Pat. No. 10,309,682, which is a continuation-in-part of application No. 14/668,079, filed on Mar. 25, 2015, now Pat. No. 9,951,969, said application No. 15/864,612 is a division of application No. 14/668,079, filed on Mar. 25, 2015, now Pat. No. 9,951,969.

(56) References Cited

U.S. PATENT DOCUMENTS

| | | |
|---|---|---|
| 9,951,969 B2 | 4/2018 | Combs |
| 10,309,682 B2 | 6/2019 | Combs |
| 10,648,695 B2 | 5/2020 | Combs |
| 10,995,969 B2 | 5/2021 | Combs |
| 11,060,756 B2 | 7/2021 | Combs |
| 11,402,121 B2 | 8/2022 | Combs |
| 2004/0130154 A1 | 7/2004 | Stepp |
| 2008/0014860 A1 | 1/2008 | Heitman |
| 2008/0045137 A1* | 2/2008 | Rosal ............ F24F 13/0263 454/292 |
| 2015/0204622 A1* | 7/2015 | Gray ............. F24F 13/0263 165/135 |

\* cited by examiner

PROCESS FOR FORMING A REGISTER BOX THAT IS ADAPTABLE TO DUCTWORK OF AN HVAC SYSTEM

CROSS-REFERENCE TO RELATED APPLICATIONS

The present application is a continuation-in-part of U.S. patent application Ser. No. 17/196,678, filed on Mar. 9, 2021 and entitled "Fixed Plug for Use in a Process of Forming an Insulated Register Box". U.S. patent application Publication Ser. No. 17/196,678 is a continuation-in-part of U.S. patent application Ser. No. 17/175,956, filed on Feb. 15, 2021 and entitled "Plug with Rotating Flap for Use in a Process for Forming an Insulated Register Box". U.S. patent application Ser. No. 17/175,956, is a continuation-in-part of U.S. patent application Ser. No. 17/175,922, filed on Feb. 15, 2021, and entitled "Plug for Use in a Process of Forming an Insulated Register Box". U.S. patent application Ser. No. 17/175,922 is a continuation-in-part of U.S. patent application Ser. No. 17/171,638, filed on Feb. 9, 2021 and entitled "Conveyor Process for Forming an Insulated Register Box". U.S. patent application Ser. No. 17/171,638 is a continuation-in-part of U.S. patent application Ser. No. 16/036,059, filed on Jul. 16, 2018 and entitled "Insulated Register Box and Process For Forming Such Insulated Register Box", now U.S. Pat. No. 11,060,756. U.S. patent application Ser. No. 16/036,059 was a continuation-in-part of U.S. patent application Ser. No. 15/864,612, filed Jan. 8, 2018, now U.S. Pat. No. 10,995,969. U.S. patent application Ser. No. 15/864,612 was a divisional of U.S. patent application Ser. No. 14/668,079, filed Mar. 25, 2015 and entitled "Insulated Register Box", now U.S. Pat. No. 9,951,969. U.S. patent application Ser. No. 16/036,059 was also a continuation-in-part of U.S. patent application Ser. No. 16/005,235, filed on Jun. 11, 2018 and entitled "Insulated Register Box with the Boot Rail Adapter", now U.S. Pat. No. 11,402,121. U.S. patent application Ser. No. 16/005,235 is a continuation-in-part of U.S. patent application Ser. No. 15/703,436, filed on Sep. 13, 2017, now U.S. Pat. No. 10,648,695. U.S. patent application Ser. No. 15/703,436 is a continuation-in-part of U.S. patent application Ser. No. 15/439,454, filed Feb. 22, 2017 and entitled "Process for Forming an Insulated Register Box", now U.S. Pat. No. 10,309,682. U.S. patent application Ser. No. 15/439,454 was a continuation-in-part of U.S. patent application Ser. No. 14/668,079, filed on Mar. 25, 2015 and entitled "Insulated Register Box and Method for Forming an Insulated Register Box", now U.S. Pat. No. 9,951,969.

BACKGROUND OF THE INVENTION

1. Field of the Invention

The present invention relates to processes for forming register box in which the register box has an insulating expandable polymeric foam material on an interior thereof. The present invention also relates to register boxes that can be adapted to various diameters of ductwork in an HVAC system.

2. Description of Related Art Including Information Disclosed Under 37 CFR 1.97 and 37 CFR 1.98

To create the desired ambient conditions within a structure, a typical HVAC system is installed for circulating and/or conditioning air drawn from the interior of the structure and returned to the interior of the structure. A central unit or several units are located in or near the structure, each unit comprising a fan for air circulation and optionally comprising a heating, humidification, or cooling system for conditioning the air passing through the central unit.

To conduct air to and from each central unit, ducting is provided in the structure. The ducting includes supply-air ducts which provide conditioned air to the interior of the structure and are connected to the outlets of each central unit and return-air ducts which return air to each central unit and are connected to inlets of each central unit. Supply-air ducts typically terminate in supply-air register boxes mounted to the walls, the ceilings, or other surfaces within the interior, whereas return-air ducts typically begin at register boxes mounted to a surface within the interior, such as a wall, ceiling, or floor. There are usually many more register boxes for supplying air than for returning air, with those for returning air typically being substantially larger than those for supplying air.

To increase efficiency, building codes are being revised to require substantially airtight HVAC systems. In the past, a standard technique has been utilized for forming such sheet-metal register boxes. A form is cut from a rectangular, planar metal sheet. The form has cutouts for corners or other features to allow bending of the form into the desired shape. Cutouts define the height of the sides and an overlapping flap is formed by cutting a slot at each cut out. The sides are bent along bend lines to lie in intersecting planes so as to form an open-bottom, rectangular enclosure of a register box, with the vertical edges of the sides abutting the inside surfaces of the sides. The flap is folded around each corner that lies adjacent the outer surface of the side and then fastened to the side with rivets. In order to complete the register box, a circular duct connector or is connected to a circular cutout in the upper surface of the box. Prior art register boxes are also formed with abutting edges to form the enclosure. The abutting or overlapping edges may be fastened by adhering or by other fastening means, such as spot welding.

The method described above produces ducting enclosures that often leak conditioned air through the gaps between the edges at the corners, or, in the case of enclosures formed with multiple pieces, through the seams where the pieces are joined together. The prior-art method includes many labor-intensive steps to form the enclosures, including the cutting of the planar sheet and the fastening of the edges.

In order to achieve the requisite efficiency in compliance with building codes, insulation is used with such register boxes. The formation of the insulation of the register boxes has become somewhat of a problem. Since the boxes are conventionally made of sheet metal, such as galvanized steel or aluminum, the insulation must be applied to either or both the inside and outside of the register box either before or after it is installed. The cutting and fastening of the insulation to the box is tedious and time-consuming. As such, it is thereby rather expensive in terms of the cost of the insulation material and in terms of the amount of time required to properly insulate the register box.

The placement of insulation can be a time-consuming, hazardous, and tedious task. Typically, a large section of fibrous material requires a cutting into various shapes that fit within the interior of the register box. This fibrous material is then affixed to the walls on the inside of the register box by hand. Often, many steps are required so as to properly fit the insulation material within the register box. Furthermore, since fibrous material is being manually handled by workers, there can be exposure to airborne fibers. The cutting and fitting of the insulation material within the register box is extremely tedious and boring to workers.

In the past, various patents have issued relating to register boxes and to the insulating of such register boxes. For example, U.S. Pat. No. 3,985,158, issued on Oct. 12, 1976 to J. V. Felter, describes a box for mounting diffusers wherein the main body of the box is made of expanded plastic or similar material. One or more connection elements are molded within the walls of the box to provide for connection of the box to the building structure and to a duct and also to reinforce the box.

U.S. Pat. No. 4,735,235, issued on Apr. 5, 1988 to Anderson et al., discloses an insulated duct end system. The system includes duct assemblies and transition components for interconnecting the duct assemblies. Each duct assembly includes an insulated duct having a rigid sleeve within at least one end. Each sleeve includes an abutment ring and orifices in the ring for permitting air to flow into the insulated area to balloon the layer and improve its insulative effect.

U.S. Pat. No. 5,095,942, issued on Mar. 17, 1992 to G. C. Murphy, teaches a plastic self-insulating ductwork system. The system includes a distribution box which includes an upper portion having a plurality of walls and a bottom plate. The distribution box is joined to interconnecting duct lines by adapter conduits. The adapter conduits are adapted at one end for connection to an opening in the wall and are adapted at the other end for connection to an adjoining duct line. U.S. Pat. No. 5,219,403, issued on Jun. 15, 1993 the G. C. Murphy, discloses a similar type of self-insulating ductwork system as that of U.S. Pat. No. 5,095,942.

U.S. Pat. No. 5,658,196, issued on Aug. 19, 1997 to T. L. Swaim, provides an air duct diffuser for attachment to a ceiling grid. The diffuser includes a frame which mounts to the ceiling grid and a louver which mounts to the frame for directing diffused air within an associated airspace. A preformed composite housing of insulating material mounts to the frame and has punch-out duct openings of varying sizes.

U.S. Pat. No. 5,749,190, issued on May 12, 1998 to S. R. Williams, shows an HVAC register box having no welded or riveted corners and also a process for making such an HVAC register box. The register box is fabricated from a single sheet of material without cutting. The register box has superior rigidity and resistance to air leakage at the joints or corners.

U.S. Pat. No. 5,957,506, issued on Sep. 28, 1999 to M. D. Stepp, provides a sheet-metal insulated register box. The register box has an adjustable elbow fitting that is coupled directly to an air inlet panel of an air distribution register box by having roll-formed flange portions that are mated in interlocking, overlapping engagement with each other. The air inlet panel includes an outwardly flared coupling flange bordering an air inlet opening. The neck of the sheet-metal elbow includes a folded coupling flange that is dimensioned for interfitting, overlapping engagement with the outwardly-flared elbow coupling flange.

U.S. Patent Publication No. 2008/0014860, published on Jan. 17, 2008 to Heitman et al., discloses a method and apparatus for eliminating register boxes. A collar plate assembly interfaces with metal air ducts and is provided with at least one spring indentation ring to accept two or more locking springs. The locking springs are used to attach the ceiling register to the collar plate assembly. The collar plate assembly uses mounting rails that attach the assembly to either the ceiling or wall supports. A trim ring is inserted in the cutout that attaches between the collar in the ceiling so as to eliminate air leakage and so as to provide an essentially smooth flow of air from the supply duct to the inside of the structure.

U.S. Patent Publication No. 2004/0130154, published on Jul. 8, 2004 to Stepp et al., shows a substantially airtight register box for HVAC systems. The register box has a body formed from at least one planar sheet. The body has an inlet and outlet. At least one of the inlet and the outlet is formed by folding corners of the planar sheet to form planar sides that lie in intersecting planes. The enclosure is then mounted to a surface of an interior area of a structure and is connected to ducts for communicating air between the interior area at a central air-handler unit.

U.S. Patent Publication No. 2008/0045137, published on Feb. 21, 2008 F. Rosal, discloses an insulated plenum box for heating, ventilating and air conditioning duct systems. This plenum box has insulation sprayed onto either the inside or outside of the plenum box in order to match the R-value of the connecting insulated duct.

The present Applicant is the owner of several patents related to such register boxes and the processes for forming such register boxes. For example, U.S. Pat. No. 11,060,756, issued on Jul. 13, 2021 to the present Applicant, describes an insulated register box and process for forming the insulated register box. This register box has a body with a plurality of side walls arranged in a generally rectangular or square configuration and a plurality of flanges extending inwardly from the plurality of side walls. An expandable polymeric material is affixed to an inner side of each of the plurality of side wall such that the expandable polymeric material has a portion extending across one end of the body inwardly of the plurality of flanges. A sheet is positioned over the portion of the expandable polymeric material at one end of the body such that the sheet is interposed between the plurality of flanges and the portion of the expandable polymeric material. The expandable polymeric material and the sheet are cuttable so as to open to the interior of the register box.

U.S. Pat. No. 10,648,695, issued on May 12, 2020 to the present Applicant, describes a register box with a boot rail adapter that has an insulating material affixed within the register box, a guide rail affixed to a side panel of the register box, and a rail having a section received in a slot of the rail guide. The rail is adapted to be affixed to a supporting surface, such as a joist. The rail guide is slidable relative to the rail. The rail guide is affixed to an exterior surface of the side panel.

U.S. Pat. No. 10,309,682, issued on Jun. 4, 2019 to the present Applicant, teaches a process for insulating a register box in which the register box has a plurality of side panels arranged in a generally rectangular configuration and a duct opening through a wall that extends across the generally rectangular configuration. This process involves flowing an expandable polymeric material toward the plurality of side panels, placing the register box into or onto a support structure, introducing a liner over the flowed expandable polymeric material within the register box, and placing a form onto the liner in the register box so as to shape the expandable polymeric material within the register box. The form and the liner then removed from the register box.

U.S. Pat. No. 11,402,121, issued on Aug. 2, 2022 to the present Applicant, teaches an insulated register box apparatus with a boot rail adapter which has an insulating material affixed within the register box, a rail affixed to a side panel of the register box, and a rail guide having a slot that receives a section of the rail therein. The rail guide is adapted to be affixed to a supporting surface. The rail is affixed at least one of the side panels of the register box. The rail is slidable relative to the rail guide. The register box has a plurality of side panels and a duct that opens to an interior of the plurality of side panels. The insulating material extends inwardly of the plurality of side panels.

U.S. Pat. No. 10,995,969, issued on May 4, 2021 to the present Applicant, teaches an insulated register box for HVAC installations that has a body with a plurality of side panels arranged in a generally rectangular or square configuration and a wall extending across the rectangular configuration. A duct opens through the wall so as to communicate with an interior of the body. An expandable foamed polymeric material is affixed to an inner side of the side panels. The wall has a surface extending from the opening of the duct to the side panels. The expandable foamed polymeric material is affixed to the surface of the wall.

U.S. Pat. No. 9,951,969, issued on Apr. 24, 2018 to the present Applicant, describes an insulated register box and a method for forming such an insulated register box. The register box has a body with a plurality of side panels arranged in a generally rectangular or square configuration and a wall extending across the rectangular configuration. A duct opens through the wall so as to communicate with the interior of the body. An expandable foamed polymeric material is affixed to an inner side of the side panels. The wall has a surface extending from the opening of the duct to the side panels. The expandable foamed polymeric material is affixed to the surface of the wall.

Upon the commercialization of the insulated register box of U.S. Pat. No. 9,951,969, it was determined that certain operations and HVAC systems had different sizes of duct and different needs associated with the insulated register box. In particular, in this prior patent, the duct was of a particular size and was integrated in the structure of the register box. However, difficulties could occur if a customer had a duct system or air movement system which was incompatible with the duct that was incorporated into the structure of the register box. Under such circumstances, creative efforts would be required so as to fit a large duct of the HVAC systems with the smaller collar of the register box. Similarly, other creative efforts would be required in order to properly secure a smaller duct with a wider collar of the register box. This adaptation and creative efforts would require relatively skilled personnel in order to complete a secure and airtight connection. As such, a need developed so as to create a more adaptable register box in which a person can create an opening in the register box that is adaptable to the particular ducting and air movement systems to which the insulated register box is applied. In such a situation, it is important that the insulating expandable polymeric material be adaptable so as to generally engage with the exterior of the external ducting to which the insulated register box is applied. This need requires the ability to connect the register box to the ductwork without special tools, installation equipment, or complicated procedures.

It is object of the present invention to provide a process for forming a register box that is adaptable to the ductwork of an HVAC system.

It is another object of the present invention to provide a process for forming a register box that has a better seal when installed with the HVAC system.

It is another object of the present invention to provide a process for forming a register box that can be customized to the particular ductwork of the HVAC system.

It is another object of the present invention to provide a process for forming a register box that provides the unskilled worker with a guide in order to form a correctly cut and dimensioned hole in the register box.

It is another object of the present invention to provide a process for forming a register box that allows unskilled workers to install the register box with the HVAC system.

It is another object the present invention to provide a process for forming a register box that is energy efficient.

It is another object of the present invention to provide a process for forming a register box that is relatively inexpensive.

It is a further object of the present invention to provide a process for forming a register box that has a smaller footprint when shipping and storing.

It is another object of the present invention to provide a process for forming a register box that minimizes air loss.

It is another object of the present invention to provide a process for forming a register box that improves insulation rating.

It is another object of the present invention to provide a process for forming a register box that is fire resistant.

It is another object to the present invention to provide a process for forming a register box that is compliant with national building codes.

It is a further object of the present invention to provide a process for forming a register box that avoids fibrous insulation.

It is still another object of the present invention to provide a process for forming a register box that improves the health and safety of workers.

It is still another object of the present invention to provide a process for forming a register box which requires a minimal number of components.

It is still a further object of the present invention to provide a process for forming a register box which allows the register box to be formed in a quick, easy and efficient manner.

These and other objects and advantages of the present invention will become apparent from a reading of the attached specification and appended claims.

BRIEF SUMMARY OF THE INVENTION

The present invention is a process for forming a register box. This process comprises the steps of: (1) forming a body having a plurality of side panels arranged in a generally square or rectangular configuration and having a wall extending transverse to the plurality of side panels; (2) cutting a plurality of circular areas into the wall; (3) introducing an expandable polymeric foam material into an interior of the body; (4) positioning the body into a fixture such that the wall is juxtaposed against a surface of the fixture; (5) inserting a plug into the interior of the body; (6) expanding the expandable polymeric foam material in the interior of the body such that the expandable polymeric foam material solidifies across the wall and around the plug; (7) removing the plug from the body; and (8) removing the body from the fixture. The plurality of side panels define an opening opposite the wall. At least one of the plurality of circular areas is adapted to be separated from a remainder of the wall.

In the process of the present invention, the step of cutting comprises pre-perforating the plurality of circular areas in concentric relation to each other. In a preferred embodiment of the present invention, the plurality of circular areas includes a first circular area of approximately six inches in diameter, a second circular area of approximately seven inches in diameter, and a third circular area of approximately eight inches in diameter. Each of the plurality of partial circular areas is discontinuous with spaces between arc segments of a circle. In the preferred embodiment of the present invention, each of the plurality of circular areas has four spaces respectively between four arc segments of circles.

The step of cutting comprises laser or plasma cutting the plurality of circular areas.

A flange is formed extending inwardly from the plurality of side panels opposite the wall. The plug is inserted so as to bear against an inward edge of the flange. A plastic liner is positioned over surfaces of the plug prior to the step of expanding the expandable polymeric foam material. The plug is locked in the interior of the body and in the fixture during the step of expanding the expandable polymeric foam material.

In the present invention, at least one of the plurality of circular areas is removed from the wall of the body. The expanded expandable polymeric foam material that is exposed by the removal of the circular area is cut through by cutting or sawing. This cut expanded expandable foam material is removed from a remainder of the expandable polymeric foam material at the wall of the body so as to open to the interior of the body. The expanded expandable polymeric material is cut by using an edge of the circular area as a guide. This removed expandable polymeric material will have a diameter approximately equal to a diameter of the circular area that is removed from the wall.

A collar is formed having an outer diameter approximately equal to a diameter of the circular area that is removed from the wall of the body. The collar is inserted through the wall and through the expanded expandable polymeric foam material such that an interior of the collar opens to the interior of the body. The collar has a portion extending outwardly of the wall of the body. The portion of the collar that extends outwardly of the wall of the body is connected to ductwork of an HVAC system. The exterior of the collar can be sealed to the wall of the body.

The step of forming the collar includes forming a plurality of bendable tabs at an end of the collar, and bending the plurality of bendable tabs so that the plurality of bendable tabs resides against a surface of the expanded expandable polymeric foam material in the interior of the body.

The present invention is also register box that comprises a body having a plurality of side panels arranged in a generally square or rectangular configuration and having a wall that extends transverse to the plurality of side panels, an expandable polymeric foam material affixed within the body so as to reside against the wall and against the plurality of side panels of the body, and a collar extending through the wall of the body and the expandable polymeric foam material so as to open to the interior of the body and to have an end extending outwardly of the wall of the body. The plurality of side panels define an opening opposite the body. The wall has a plurality of circular areas cut thereinto. At least one of the plurality of circular areas is selectively removable from the wall. A portion of the expandable polymeric foam material and the wall is removable at a location corresponding to the selectively removable circular area. The collar has a plurality of bendable tabs formed at one end thereof. The plurality of bendable tabs overlies the expandable polymeric foam material in the interior of the body.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
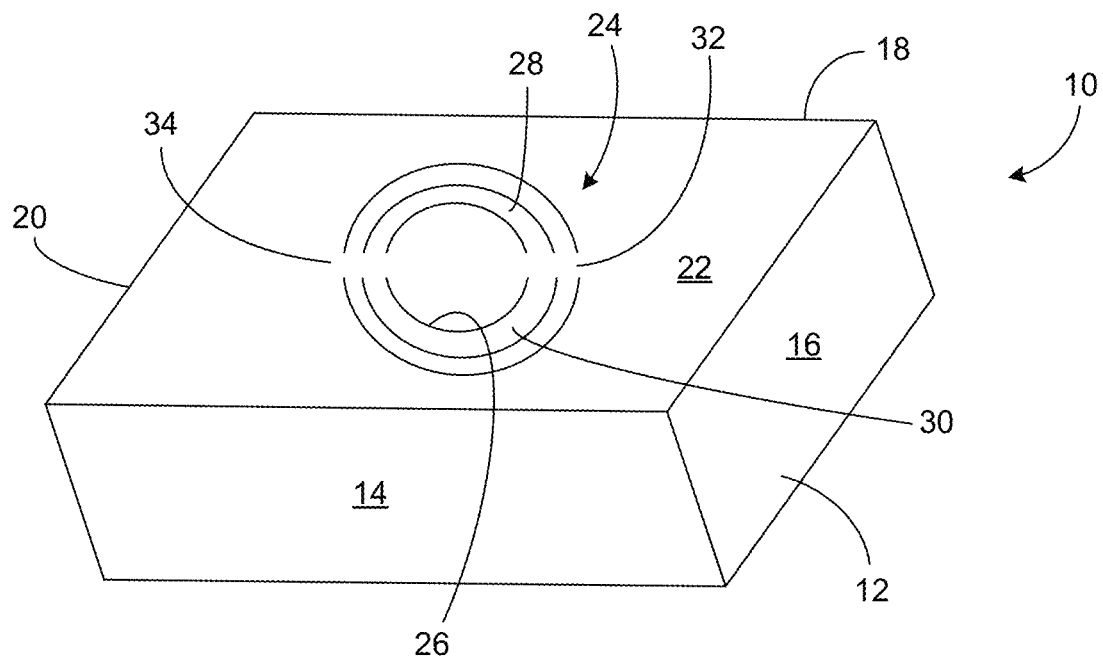
FIG. 1 is an upper perspective view of the register box formed in accordance with the process of the teachings of the present invention.

FIG. 1 shows the register box 10 that has been formed in accordance with the teachings of the process of the present invention. The register box 10 includes a body 12 having a plurality of side panels 14, 16, 18 and 20 arranged in a generally rectangular or square configurations. Side panels 16 and 20 extend between side panels 14 and 18. A wall 22 extends in generally transverse relation to the plurality of side panels 14, 16, 18 and 20. A plurality of circular areas 24 is cut into the wall 22. The plurality of circular areas 24 defines a first circular area 26, a second circular area 28 and a third circular area 30. Each of the circular areas 26, 28 and 30 is laser or plasma cut into the wall 22. Each of the circular areas 26, 28 and 30 has a different diameter. These circular areas are cut through the thickness of the wall 22. Uncut spaces 32 and 34 are formed between the ends of arc segments of the circular areas. In particular, it can be seen that the circular area 26 has a first arc segment that is separated from a second arc segment by the spaces 32 and 34. Similarly, circular area 28 has arc segments that are separated by the uncut spaces 32 and 34. The circular area 30 has arc segments that are separated by the uncut spaces 32 and 34. The uncut spaces provide a place whereby each of the circular areas can be bent back-and-fourth so as to separate from the wall 22 (in the manner to be described hereinafter). The different diameters of the circular areas 26, 28 and 30 allows the register box 10 of the present invention to be adaptable to various collars received therein and extending therethrough. These collars are in the nature of collars that can be connected to the ductwork of an HVAC system.

Figure 2:
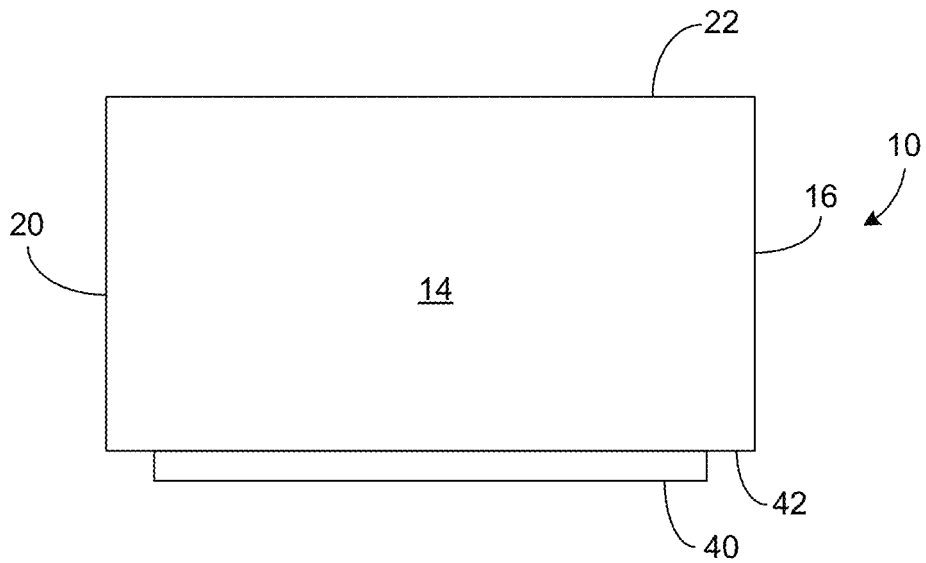
FIG. 2 is a side elevational view of the register box formed in accordance with the process of the present invention.

FIG. 2 shows a side view of the register box 10 of the present invention. In particular, FIG. 2 shows the side panel 14. Side panel 14 extends transverse to the side panels 16 and 20. A flange 40 extends downwardly from the bottom of the register box 10. Flange 40 defines an opening at the bottom 42 opposite the wall 22.

Figure 3:
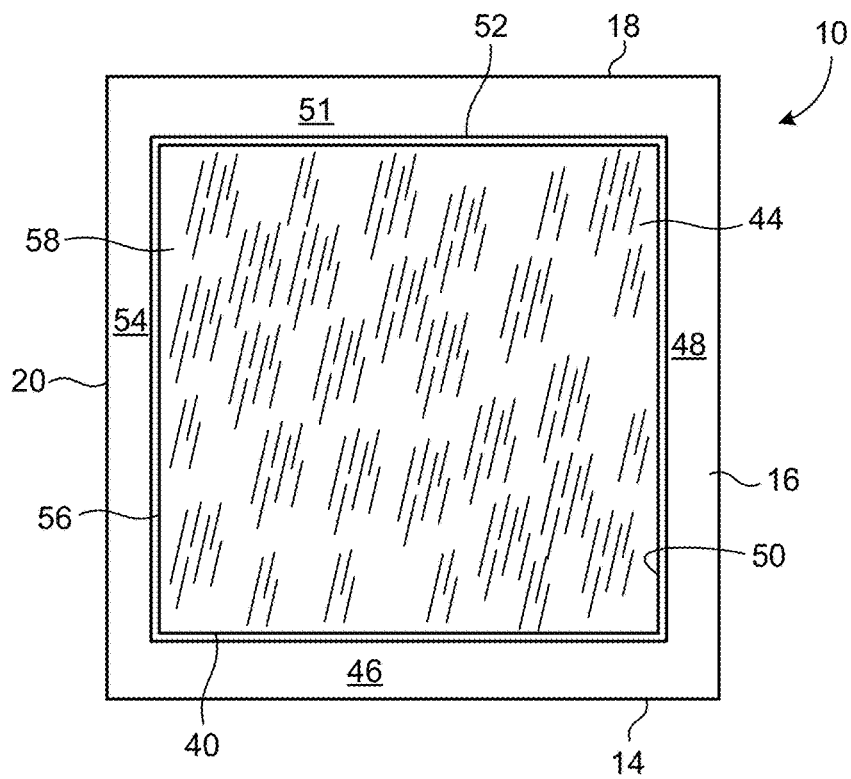
FIG. 3 is a bottom view of the register box formed in accordance with the process of the present invention.

FIG. 3 shows a bottom view of the register box 10 of the present invention. In particular, in FIG. 3, the expanded polymeric foam material 44 within the interior of the register box 10 is particularly illustrated. This expandable polymeric foam material 44 will reside against the inner surface of the wall 22 and against the inner surfaces of the side panels 14, 16, 18 and 20.

FIG. 3 shows that the side panel 14 has a flange 46 extending inwardly therefrom. Flange 40 extends downwardly from an edge of the flange 46 opposite side panel 14. Similarly, side panel 16 has a flange 48 that extends inwardly therefrom. Another flange 50 will extend outwardly from the edge of flange 48 opposite side panel 16. The side panel 18 has a flange 51 that extends inwardly therefrom. Another flange 52 will extend outwardly from the edge of flange 51 opposite to side panel 18. Side panel 20 has a flange 54 extending inwardly therefrom. Another flange 56 will extend outwardly from flange 54 at an edge opposite to the side panel 20. Flanges 40, 50, 52 and 56 define the opening 58. Opening 58 will be opposite to the circular areas 24 on the wall 22. As will be described hereinafter, the expandable polymeric foam material 44 will reside against the side panels 14, 16, 18 and 20 and will be generally retained within the area of the flanges 46, 48, 51 and 54.

Figure 4:
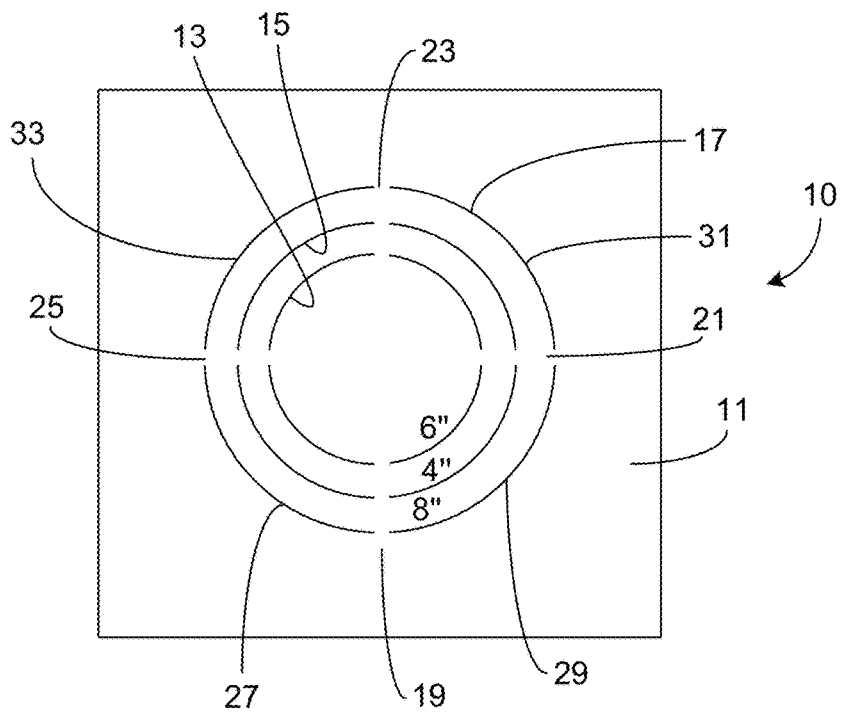
FIG. 4 is a plan view showing the register box formed in accordance with a preferred embodiment of the process of the present invention.

FIG. 4 shows an alternative embodiment of register box 10. In register box 10, it can be seen that the wall 11 includes a plurality of circular areas 13, 15 and 17. In particular, circular area 13 has a diameter of approximately six inches. Circular area 15 has a diameter of approximately seven inches. Circular area 17 has a diameter of approximately eight inches. Each of the circular areas 13, 15 and 17 are concentric. Each of the circular areas 13, 15 and 17 is discontinuous with spaces 19, 21, 23 and 25 between arc segments of each of the circular areas 13, 15 and 17. In particular, can be seen that each of the circular areas 13, 15 and 17 has four spaces respectively between four arc segments 27, 29, 31 and 33. The circular areas are laser or plasma cut into the wall 11. The configuration of the circular areas 13, 15 and 17, as shown in FIG. 4, offers a better ability to resist deformation during the expanding of the expandable polymeric material within the interior of the register box 10. Each of the circular areas 13, 15 and 17 is pre-perforated through the wall 11. As such, a circle area of a desired diameter can be created by simply removing one or more of the circular areas 13, 15 and 17. The removal of at least one of the circular areas 13, 15 and 17 will expose the expanded expandable polymeric material located in the interior of the register box 10.

Figure 5:
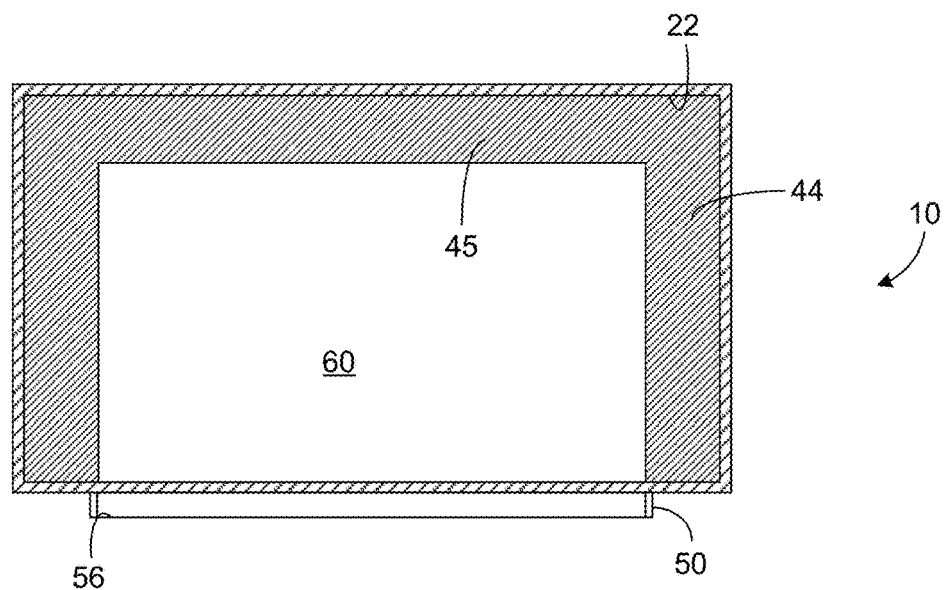
FIG. 5 is a cross-sectional view of the register box formed in accordance with the process of the present invention.

FIG. 5 shows the insulated register box 10 of the present invention with the expandable polymeric foam material 44 positioned within the interior of the register box 10. The void 60 is formed in the interior of the register box of the present invention in a manner to be described hereinafter. As can be seen, the expandable polymeric foam material is generally aligned with the flanges 50 and 56. The expandable polymeric foam material 44 will extend a similar distance away from the inner surface of the wall 22. It can be seen that the expandable polymeric foam material 44 has a portion 45 that resides against the inner surface of wall 22. As such, when at least one of the circular areas 13, 15 and 17 is removed, the surface of the expandable polymeric foam material 44 will be exposed. In order for a user to form the desired opening through the expandable polymeric foam material 44 at the wall 22, it is only necessary to cut or saw through the expandable polymeric foam material that is exposed by the removal of the circular area. This can be easily accomplished by simply using the outline of the removed circular area as a guide for the cutting or sawing. As such, a uniformed cut-out of the expanded expandable polymeric foam material can be achieved. This cut-out will have a similar diameter to that of the circular area that has been the removed from the wall 22. As such, the void 60 of the register box 10 is exposed. The hole created by sawing through the expandable polymeric foam material 44 will allow for the introduction of a collar into the void 60 (in the manner to be described hereinafter).

Figure 6:
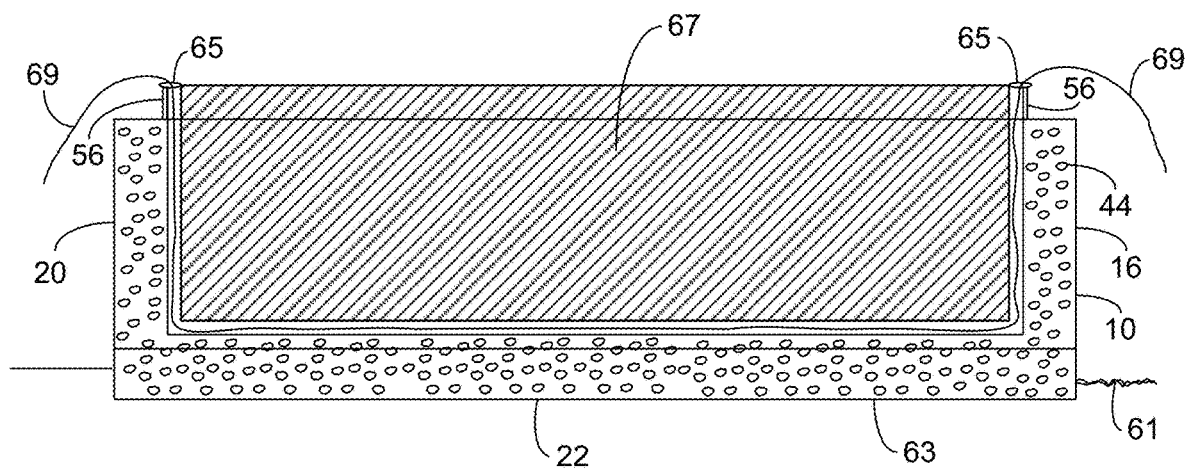
FIG. 6 is a cross-sectional view showing the register box as being formed in accordance with the process of the present invention.

FIG. 6 shows the process for forming the register box 10. The register box 10 is shown as having side panels 16 and 20 and wall 22 extending between side panels 16 and 20. Wall 22 is positioned face down in fixture 61. Fixture 61 includes a surface 63 against which the wall 22 resides. As the expandable polymeric foam material 44 expands, the surface 63 of fixture 61 will resist the deformation of those areas defined by the circular areas 26, 28 and 30. The register box 10 is locked in position by fasteners 65. Fasteners 65 bear against the flanges 50 and 56 (or other surfaces) at the open end of the register box 10. Fasteners 65 will lock the register box 10 in place.

The expandable polymeric foam material 44 is initially introduced into an interior of the register box 10. The introduction of the expandable polymeric foam material can be carried out before or after the register box 10 is received within fixture 61. After the expandable polymeric foam material is introduced into the interior of the register box 10, a plug 67 is positioned within the register box 10 and also locked in place. A plastic sheet 69 is placed around the outer surfaces of the plug 67. Plastic sheet 69 allows the plug 67 to be removed from the expanded expandable polymeric foam material 44. Fasteners 65 serve to lock the plug 67 in position during the expansion of the expandable polymeric foam material 44.

Ultimately, after the expandable polymeric foam material 44 expands so as to extend against the side panels of the register box 10 and over the wall 22 of the register box 10, the plug 67 can be removed. The fastener 65 can be loosened and the plug 67 removed from the interior of the register box 10. This can be carried out by simply gripping the edges of the plastic sheet 69 and lifting the plug 67. As result of the removal of the plug 67, the void 60 of the register box is formed. The register box 10 can then be lifted from the fixture 61.

This process is carried out in a simple, easy and efficient manner. Multiple register boxes can be placed into a carousel-type fixture so that multiple register boxes can be created in an assembly line-style fashion. The manner of forming the void 60 of the register box 10 is described previously in conjunction with the U.S. Pat. No. 11,060,756 of the present Applicant. The locking of the wall 22 against the surface 63 of fixture 61 assures that the wall 22 is not deformed in the area of the circular areas during the expansion of the expandable polymeric foam material.

Figure 7:
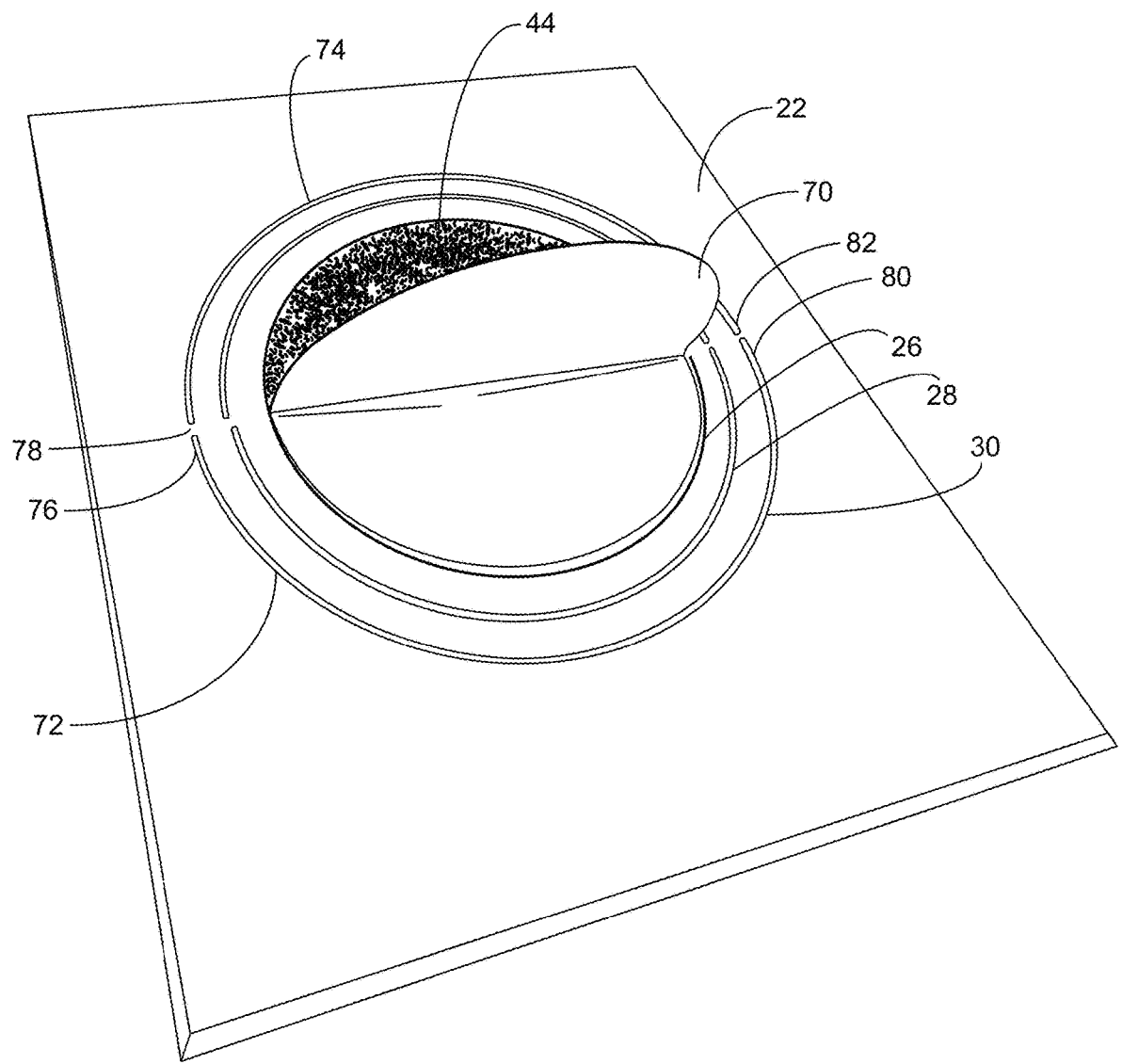
FIG. 7 is an upper perspective view showing the removal of one of the circular areas in accordance teachings of the process of the present invention.

FIG. 7 illustrates the wall 22 during the removal of the circular area 70. In particular, FIG. 7 shows the circular areas 26, 28 and 30. Circular area 26 defines circular member or disc 70 therein. The circular member or disc 70 is of thirty gauge galvanized stainless steel. Importantly, each of the circular areas 26, 28 and 30 is sized so as to fit the various diameters of ductwork associated with HVAC systems. The circular area 26 is for smaller ducts. Circular area 28 is for intermediate size ducts. Circular area 30 is for larger diameter ducts. Importantly, so as to connect with the ductwork, the circular members or discs associated with these circular areas 26, 28 and 30 can be selectively removed so as to allow a collar to be inserted therein (in the manner described hereinafter).

In FIG. 7, it can be seen that the circular area 30 has a first arc segment 72 and a second arc segment 74. End 76 of arc segment 72 is spaced from end 78 of arc segment 74. Similarly, end 80 of arc segment 72 is separated from end 82 of arc segment 74. The similar spacing occurs with respect to the other circular areas 26 and 28. The spacing allows the particular circular area to be folded back-and-forth so as to separate the circular member or disc from the remainder of the wall. FIG. 7 shows a circular member or disc 70 as being folded in this manner. It is only necessary to grab an edge of the cut circle, lift it, and move it back-and-forth until the circular member or disc is separated from the remainder of the wall. This will expose the expandable polymeric foam material 44 located on the inner side of wall 22.

With reference to FIG. 7, the circular member or disc 70 will be separated from the remainder of the wall 22 such that the expandable polymeric foam material 44 is exposed. A knife, a saw, or similar device can be used so as to saw or cut through the expandable polymeric foam material 44 and follow the outline of the circular area 26. This will allow the expandable polymeric foam material 44 in the interior of the circular area 26 to be removed and to expose the interior 60 of the register box 10. Importantly, the configuration of the present invention makes it easy for a worker to create this hole in the expandable polymeric foam material 44. The edges of the wall a the removed circular areas can serve as a guide. As such, is only necessary for a worker to extend a knife, a saw, or similar device through the expandable polymeric foam material 44 and saw or cut around the perimeter of the opening left by the removal of the circular member or disc 70. As such, this will open to the interior of the register box 10.

Figure 8:
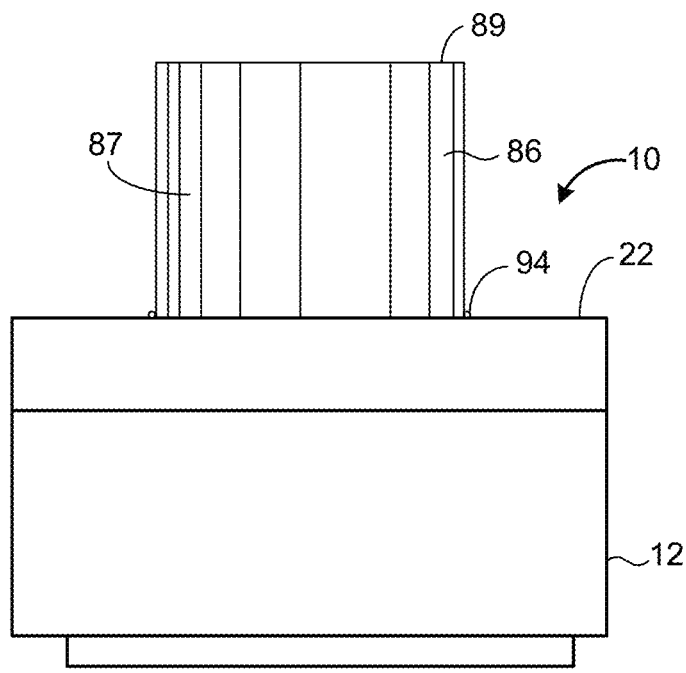
FIG. 8 is a side elevational view of the register box and collar that is formed in accordance with the process of the present invention.

With reference to FIG. 8, it can be seen that a collar 86, having a size corresponding to the diameter of the circular area 26, can be inserted into the opening. Collar 86 has a portion 87 extending outwardly of the wall 22 of the register box 10. The opposite end of the collar 86 will open to the void 60 of the register box 10. End 89 of collar 86 can be engaged or connected to the ductwork of an HVAC system. A sealant 94 can be applied in the area of the juncture between the collar 86 and the wall 22. The pliability of the expandable polymeric foam material 44 will ensure a tight seal between the exterior surfaces of the collar 86 and the expandable polymeric foam material.

Figure 9:
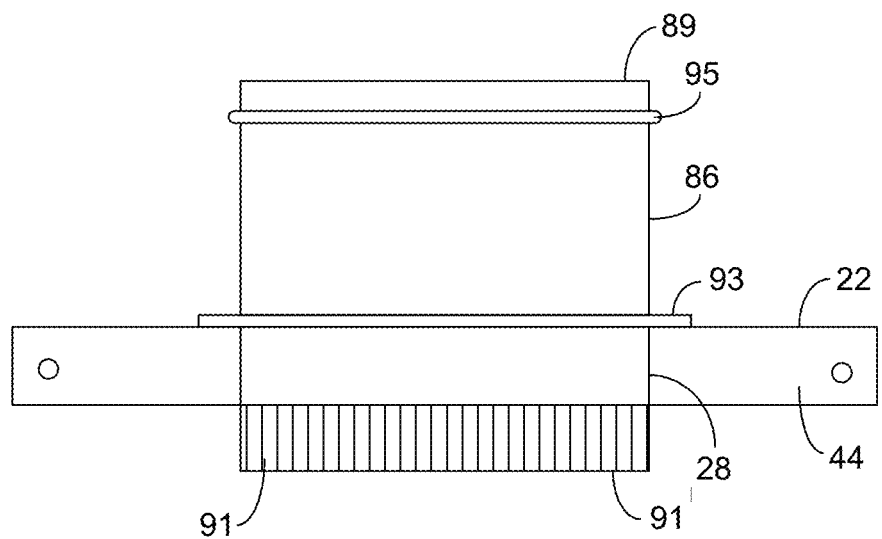
FIG. 9 is a side elevational view showing the configuration of the collar formed in accordance with the process of the present invention.

FIG. 9 illustrates the manner in which the collar 86 is received within the interior of the register box. Collar 86 has a generally circular cross-section and a cylindrical shape. The outer diameter of the collar 86 will match the diameter of the opening created by the removal of one of the circular areas 26, 28 and 30. FIG. 9 shows that the collar 86 is received within the opening 28. Opening 28 will be formed through the wall 22 and through the expandable polymeric foam material 44 adjacent to the wall 22. The collar 86 is illustrated as having a plurality of bendable tabs 91 at the end that is opposite end 89. Bendable tabs 91 can be bent so as to overlie the expandable polymeric foam material adjacent to the wall 22. A seal flange 93 is placed in the area adjacent the outer surface of the wall 22 and around the outer diameter of the collar 86. Another O-ring seal 95 can be placed around the outer diameter of the collar 86 adjacent to the end 89. This O-ring seal 95 can be used so as to facilitate the air-tight joinder of the end 89 with the ductwork of an HVAC system.

Figure 10:
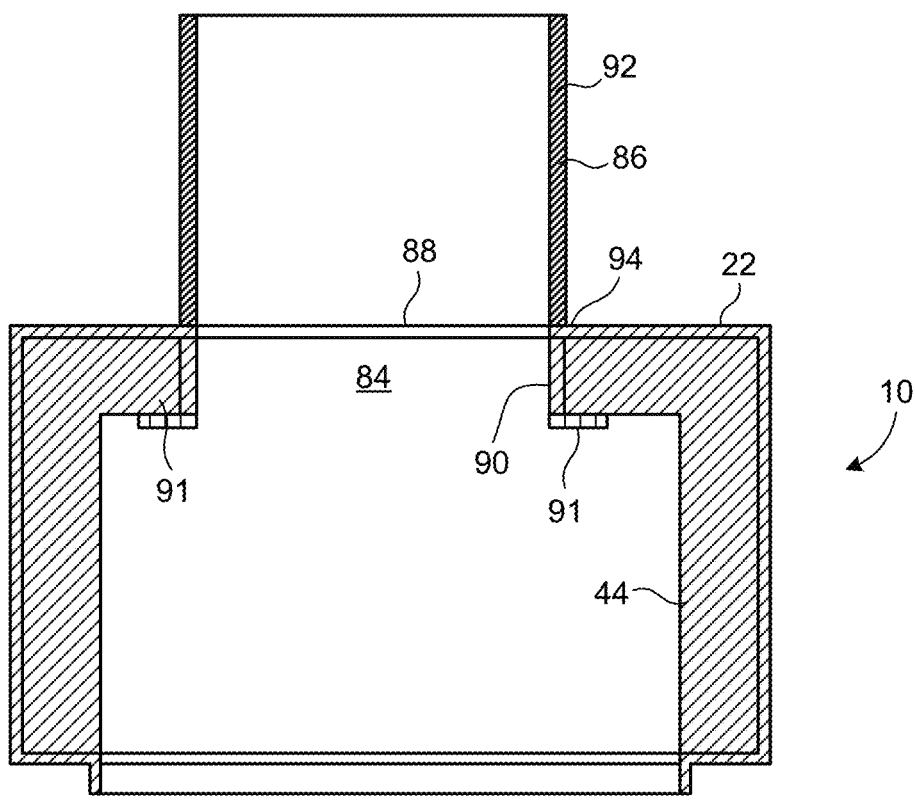
FIG. 10 is a cross-sectional view showing the collar as installed within the register box formed in accordance with the process of the present invention.

FIG. 10 shows a further step in the process of the present invention. In FIG. 10, the removed circular element or disc 70 is separated from the remainder of the wall 22 such that the expandable polymeric foam material 44 is exposed. A knife can be used so as to saw through the expandable polymeric foam material 44 and a follow the outline of the circular area 26. This will allow the expandable polymeric foam material 44 in the interior of the circular area 26 to be removed and to expose the void 60 on the interior of the register box 10. This configuration makes it easy for a worker to create this hole in the expandable polymeric foam material 44. The edges of the cut circular area serve as a guide. It is only necessary for a worker to extend a knife, or similar device, into the expandable polymeric foam material 44 and saw around the perimeter of the opening left by the removal of the circular element or disc 70. As such, this will open area 84 within the register box 10. The collar 86, having a size corresponding to the diameter of the circular area 26, can then be inserted into the opening 88. As a result, collar 86 will have a portion 90 residing against the expandable polymeric material 44 and another portion 92 extending outwardly of the register box 10. Portion 92 can be engaged with the ductwork of an HVAC system. A sealant 94 (or seal flange) can be applied at the area of the juncture between the collar 86 and the wall 22. The pliability of the expandable polymeric foam material 44 will ensure a tight seal between the exterior surfaces of portion 90 and the expandable polymeric foam material 44.

FIG. 10 further shows that the bendable tabs 91 are folded outwardly so as to overlie the surfaces of the expandable polymeric foam material 44 that resides adjacent to the wall 22. The folding of the bendable tabs assures the secure placement of the collar 86 within the opening 88. It further serves to assure a tight fit between the portion 90 of the collar 86 and the surfaces of the expandable polymeric foam material 44. In order to bend the bendable tabs 91, a worker can simply use a tool in order to bend these tabs 91 after the collar 86 is installed in the register box 10.

The present invention offers a wide variety of advantages over the prior art. In particular, the process of the present invention allows the register box to be adaptable to ductwork of various HVAC systems. As such, it is not necessary for a customer to specify, with precision, the diameter of the ductwork for such an HVAC system. The register box 10 can be supplied for installation with various systems. Since the circular areas formed in the wall 22 can be selectively removed, they can be formed so as to match the diameter of the collar and the associated ductwork of the HVAC system. This also allows a better seal to be created when installed. Adaptation between unequal diameters is not required by the register box created by the process of the present invention. The register box created by the process of the present invention can be customized to the particular HVAC system and ductwork associated therewith.

The unique configuration of the register box created by the process of the present invention allows the cut circular area to serve as a guide for the cutting of the expandable polymeric foam material when forming the hole that opens to the void in the interior of the register box. This guide makes it easier for unskilled workers to form the proper diameter of the hole for accommodating the collar. Proper cuts are automatically achieved because of the configuration of the present invention. Unskilled workers can be used so as to adapt the register box created by the process of the present invention to the various sizes of ductwork of conventional HVAC systems.

The process of the present invention provides a register box with a smaller footprint for the storage and transportation. In the prior art, the collar is directly and rigidly affixed to the register box during the process of forming the register box. In the present invention, the collar can be shipped separate from the register box. The register boxes can easily be stacked one upon the other. This creates a very minimal footprint. The collars can be stored elsewhere for easy shipping. The installation of the collar within the register box can be carried out on-site with little or no difficulty.

The expandable polymeric foam material that is used on the interior of the register box is very energy efficient. The expandable polymeric foam material can be easily installed. This is particularly true since the expandable polymeric foam material residing against the inner surface of the wall does not need to be pre-formed. The expandable polymeric foam material that is used for the installation of the register box of the present invention can be simply injected into the interior of the register box so as to expand around a plug placed in the interior of the register box. The expandable polymeric foam material minimizes air loss since it covers all surfaces on the interior of the register box. This will improve the insulation rating of the register box. The expandable polymeric foam material is fire-resistant and is compliant with national building codes. The expandable polymeric foam material avoids the use of fibrous insulation and, as such, will improve the health and safety of the workers.

The foregoing disclosure and description of the invention is illustrative and explanatory thereof. The various changes in the details of the various steps of the present invention can be made within the scope of the present claims without departing from the true spirit of the invention. The present invention should only be limited by the following claims and their legal equivalents.

I claim:

1. A process for forming a register box, the process comprising:
    forming a body having a plurality of side panels arranged in a square or rectangular configuration, the body having a wall extending transverse to the plurality of side panels, the plurality of side panels defining an opening opposite the wall;
    cutting a plurality of circular areas into the wall, at least one of the plurality of circular areas being adapted to be separated from a remainder of the wall;
    introducing an expandable polymeric foam material into an interior of the body;
    positioning the body into a fixture such that the wall is juxtaposed against a surface of the fixture;
    inserting a plug into the interior of the body;
    expanding the expandable polymeric foam material in the interior of the body such that the expandable polymeric foam material solidifies across the wall and around the plug;
    removing the plug from the body; and
    removing the body from the fixture.

2. The process of claim 1, wherein the step of cutting comprises:
    pre-perforating the plurality of circular areas in concentric relation to each other.

3. The process of claim 2, wherein the step of pre-perforating further comprises:
    forming the plurality of circular areas having a first circular area of six inches in diameter and a second circular area of seven inches in diameter and a third circular area of eight inches in diameter.

4. The process of claim 2, wherein each of the plurality of circular areas is discontinuous with spaces between arc segments of a circle.

5. The process of claim 4, wherein each of the plurality of circular areas has four spaces respectively between four arc segments of the circle.

6. The process of claim 1, wherein the step of cutting comprises:
    laser or plasma cutting the plurality of circular areas.

7. The process of claim 1, wherein the step of forming comprises:
    forming a flange extending inwardly from the plurality of side panels opposite the wall, the step of inserting comprises:
    inserting the plug so as to bear against an inward edge of the flange.

8. The process of claim 1, further comprising:
    positioning a plastic liner over surfaces of the plug prior to the step of expanding the expandable polymeric foam material.

9. The process of claim 1, further comprising:
    locking the plug in the interior of the body and in the fixture during the step of expanding the expandable polymeric foam material.

10. The process of claim 1, further comprising:
    removing at least one of the plurality of circular areas from the wall of the body;
    cutting the expanded expandable polymeric foam material through the expandable polymeric foam material exposed by the removal of the at least one of the plurality of circular areas; and
    removing the cut expanded expandable polymeric foam material from a remainder of the expandable polymeric foam material at the wall of the body so as to open to the interior of the body.

11. The process of claim 10, wherein the step of cutting the expanded expandable polymeric foam material comprises:
    cutting the expanded expandable polymeric foam material by using an edge of the remainder of at least one of the plurality of circular areas as a guide.

12. The process of claim 10, wherein the removed expanded expandable polymeric foam material has a diameter approximately equal to a diameter of the removed at least one of the plurality of circular areas.

13. The process of claim 10, further comprising:
    forming a collar having an outer diameter, the outer diameter of the collar being approximately equal to a diameter of the removed at least one of the plurality of circular areas.

14. The process of claim 13, further comprising:
    inserting the collar through the wall and through the area of the expanded expandable polymeric foam material exposed by the step of removing the cut expanded expandable polymeric foam material such that an interior of the collar opens to the interior of the body.

15. The process of claim 14, wherein the collar has a portion extending outwardly of the wall of the body.

16. The process of claim 15, further comprising:
connecting the portion of the collar that extends outwardly of the wall of the body to ductwork of an HVAC system.

17. The process of claim 15, further comprising:
sealing an exterior of the collar to the wall of the body.

18. The process of claim 14, wherein the step of forming the collar comprises:
forming a plurality of bendable tabs at an end of the collar; and
bending the plurality of bendable tabs so that the plurality of bendable tabs resides at a surface of the expanded expandable polymeric foam material in the interior of the body.

* * * * *